United States Patent
Gupta et al.

(10) Patent No.: US 10,968,891 B2
(45) Date of Patent: Apr. 6, 2021

(54) METHOD OF CONTROLLING ACTIVE POWER GENERATION OF A WIND POWER PLANT AND WIND POWER PLANT

(71) Applicant: VESTAS WIND SYSTEMS A/S, Aarhus N (DK)

(72) Inventors: Manoj Gupta, Singapore (SG); Kouroush Nayebi, Ikast (DK); Ravi Kumar, Sengkang (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/524,208

(22) PCT Filed: Oct. 14, 2015

(86) PCT No.: PCT/DK2015/050317
§ 371 (c)(1),
(2) Date: May 3, 2017

(87) PCT Pub. No.: WO2016/070882
PCT Pub. Date: May 12, 2016

(65) Prior Publication Data
US 2017/0335824 A1    Nov. 23, 2017

(30) Foreign Application Priority Data
Nov. 3, 2014    (DK) .................. 2014 70669

(51) Int. Cl.
F03D 7/04     (2006.01)
F03D 7/02     (2006.01)
(Continued)

(52) U.S. Cl.
CPC ........... *F03D 7/048* (2013.01); *F03D 7/0284* (2013.01); *H02J 3/16* (2013.01); *H02J 3/386* (2013.01);
(Continued)

(58) Field of Classification Search
CPC .......... F03D 7/048; F03D 7/0284; H02J 3/16; H02J 3/48; F05B 2270/1033; F05B 2270/337
See application file for complete search history.

(56) References Cited

U.S. PATENT DOCUMENTS 7,966,103 B2 *  6/2011  Jorgensen ............. F03D 7/0224
                                                          700/297
8,020,021 B2 *  9/2011  Bengtson ................ F03D 7/047
                                                              713/2
(Continued)

FOREIGN PATENT DOCUMENTS

CN    103199558 A    7/2013
CN    103825307 A    5/2014
(Continued)

OTHER PUBLICATIONS

International Search Report for PCT/DK2015/050317, dated Jan. 7, 2016.
(Continued)

*Primary Examiner* — Tulsidas C Patel
*Assistant Examiner* — Joseph Ortega
(74) *Attorney, Agent, or Firm* — Patterson + Sheridan, LLP

(57) ABSTRACT

In various embodiments of the present disclosure, there is provided a method of controlling active power generation of a wind power plant coupled to a power grid, the wind power plant including a power plant controller for controlling a plurality of wind turbine generators. In an embodiment, the method includes monitoring an operational status of a plant compensation equipment and adjusting a plant reactive power capability when the operational status of the plant compensation equipment indicates a fault in the plant compensation equipment. According to an embodiment, the method includes controlling the wind power plant to curtail the active power generated by the wind power plant by a (Continued)

curtailment amount determined based on the adjusted plant reactive power capability. A corresponding wind power plant is further provided.

14 Claims, 4 Drawing Sheets

(51) Int. Cl.
*H02J 3/16* (2006.01)
*H02J 3/48* (2006.01)
*H02J 3/38* (2006.01)
*H02J 3/00* (2006.01)

(52) U.S. Cl.
CPC ......... *H02J 3/48* (2013.01); *F05B 2270/1033* (2013.01); *F05B 2270/337* (2013.01); *H02J 3/001* (2020.01); *Y02E 10/72* (2013.01); *Y02E 10/76* (2013.01); *Y02E 40/30* (2013.01)

(56) References Cited

U.S. PATENT DOCUMENTS

| | | | | |
|---|---|---|---|---|
| 8,049,352 B2* | 11/2011 | Jorgensen | ............. | F03D 7/0284 290/44 |
| 8,090,972 B2* | 1/2012 | Bengtson | ............... | G05B 15/02 702/1 |
| 8,239,702 B2* | 8/2012 | Bengtson | ............... | F03D 7/047 713/375 |
| 8,692,419 B2* | 4/2014 | Fortmann | ............. | H02J 3/1885 307/153 |
| 2010/0025994 A1* | 2/2010 | Cardinal | ................. | H02M 1/00 290/44 |
| 2010/0274401 A1* | 10/2010 | Kjaer | ...................... | F03D 7/048 700/287 |
| 2010/0308585 A1* | 12/2010 | Jorgensen | ............... | H02J 3/386 290/44 |
| 2011/0049903 A1* | 3/2011 | Jorgensen | ............. | F03D 7/0224 290/55 |
| 2011/0088748 A1* | 4/2011 | Lee | ...................... | H02M 5/293 136/244 |
| 2011/0148114 A1* | 6/2011 | Garcia | .................... | H02J 3/381 290/44 |
| 2011/0301769 A1* | 12/2011 | Lovmand | ................. | F03D 7/048 700/287 |
| 2012/0300510 A1* | 11/2012 | Jensen | ..................... | H02J 3/36 363/35 |
| 2013/0076037 A1* | 3/2013 | Garcia | .................... | H02P 9/00 290/44 |
| 2013/0128630 A1* | 5/2013 | Jensen | ..................... | H02J 3/36 363/35 |
| 2013/0214536 A1* | 8/2013 | Wakasa | .................... | H02J 3/386 290/44 |
| 2014/0375052 A1* | 12/2014 | Nielsen | .................. | F03D 7/0284 290/44 |
| 2015/0016159 A1* | 1/2015 | Deboy | ..................... | H02J 3/383 363/71 |
| 2015/0035366 A1* | 2/2015 | Benesch | .................... | H02J 3/00 307/52 |
| 2015/0092462 A1* | 4/2015 | Ohori | ...................... | H02M 1/42 363/71 |
| 2015/0162847 A1* | 6/2015 | Ushiki | .................... | H02M 7/46 363/126 |
| 2015/0198145 A1* | 7/2015 | Diedrichs | ................. | F03D 7/04 700/287 |
| 2015/0314696 A1* | 11/2015 | Wang | ...................... | B60L 53/63 701/22 |
| 2016/0006243 A1* | 1/2016 | Jovcic | ....................... | H02J 3/36 363/35 |
| 2016/0013653 A1* | 1/2016 | Dorn | ..................... | H02M 7/003 363/35 |
| 2016/0028235 A1* | 1/2016 | Sun | ...................... | H02J 13/0006 700/298 |
| 2016/0036229 A1* | 2/2016 | Shao | ...................... | G05B 15/02 700/298 |
| 2016/0049792 A1* | 2/2016 | Burra | .................. | G05B 19/0421 307/52 |
| 2016/0072292 A1* | 3/2016 | Rogers | .................... | H02J 3/381 307/62 |
| 2016/0201651 A1* | 7/2016 | Beekman | ................ | F03D 9/257 290/44 |
| 2016/0204612 A1* | 7/2016 | Brogan | ................... | H02M 7/04 307/82 |
| 2016/0254668 A1* | 9/2016 | Huang | ...................... | H02J 3/36 307/64 |
| 2016/0329713 A1* | 11/2016 | Berard | .................... | H02J 3/386 |

FOREIGN PATENT DOCUMENTS

| | | |
|---|---|---|
| DE | 19603116 A1 | 8/1997 |
| EP | 2221958 A1 | 8/2010 |
| WO | 2012000515 A2 | 1/2012 |
| WO | 2014034427 A1 | 3/2014 |
| WO | 2014071948 A1 | 5/2014 |
| WO | 2014165366 A1 | 10/2014 |

OTHER PUBLICATIONS

Danish Search Report for PA 2014 70669, dated Jun. 1, 2015.
Chinese Search Report for Application 2015800596629, filed May 3, 2017.

* cited by examiner

US 10,968,891 B2

METHOD OF CONTROLLING ACTIVE POWER GENERATION OF A WIND POWER PLANT AND WIND POWER PLANT

TECHNICAL FIELD

The present disclosure describes embodiments generally relating to a method of controlling a wind power plant. Embodiments can provide for a method of controlling active power generation of a wind turbine plant. The present disclosure also describes a wind power plant configured to carry out a method of controlling a wind power plant.

BACKGROUND

The development and acceptance of wind energy as a clean and productive source of alternative energy is proliferating. Wind energy can be captured by a wind turbine generator, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbine generators may be arranged together to form a wind park or wind power plant.

The significant growth in acceptance of wind power generation has led to various countries and electrical grid operators implementing stringent grid connection requirements, also known as grid codes. Some grid codes require a wind power plant to meet a certain reactive power requirement such that the wind power plant is capable of importing and/or exporting reactive power during voltage disturbances in the grid.

Power factor can be generally be defined as the ratio of real power flowing to the load to the apparent power in the circuit. Generally, the grid requirements are defined in terms of absolute power factor values, which depend on active power dispatched by the wind power plant, at the point of common coupling.

Some grid codes, however, do define their power factor requirement as an amount of reactive power imported or exported based on the nominal rating of the wind power plant and irrespective of the active power generation. As such, power factor requirement can be identified as a reactive power requirement. In such cases, additional reactive power compensation is required for the wind power plant to meet the grid code.

Typically, this compensation can be provided by a dynamic reactive power source, such as a static synchronous compensator (STATCOM) or a static VAR compensator (SVC) or by static devices such as MSCs (Mechanically switched Capacitors). However, complications may arise, if for some reason, the reactive power compensation for which the wind power plant relies on for grid code compliance becomes unavailable, for example, due to equipment fault or even data communication breakdown or error. As a result, the wind power plant will not be able to control the MSC or STATCOM and would not be able to meet grid code requirements at full generation, which may lead to financial penalties for the wind power plant operator or in a more detrimental scenario, result in disconnection from the grid because the wind power plant is not able to maintain the required reactive capability as demanded in the grid code and has potential risk on reactive power availability within the grid.

SUMMARY

There is as such a desire for a method of operating a wind power plant, which provides compliance with grid code power factor or reactive power requirements with respect to the capability of the wind power plant.

According to various embodiments, there is provided a method of controlling active power generation of a wind power plant coupled to a power grid, the wind power plant including a power plant controller for controlling a plurality of wind turbine generators, the method including: monitoring an operational status of a plant compensation equipment; adjusting a plant reactive power capability when the operational status of the plant compensation equipment indicates a fault in the plant compensation equipment; controlling the wind power plant to curtail the active power generated by the wind power plant by a curtailment amount determined based on the adjusted plant reactive power capability.

According to various embodiments, there is provided a wind power plant, including a plurality of wind turbine generators; plant compensation equipment including a plurality of compensation modules; and a power plant controller, configured for controlling the plurality of wind turbine generators, including: a monitoring module configured to monitor an operational status of the plant compensation equipment; a reactive power capability module configured to adjust a plant reactive power capability when the operational status of the plant compensation equipment indicates a fault in the plant compensation equipment; a curtailment module configured to control the wind power plant to curtail an active power generated by the wind power plant by a curtailment amount determined based on the adjusted plant reactive power capability.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which.

DETAILED DESCRIPTION

Figure 1:
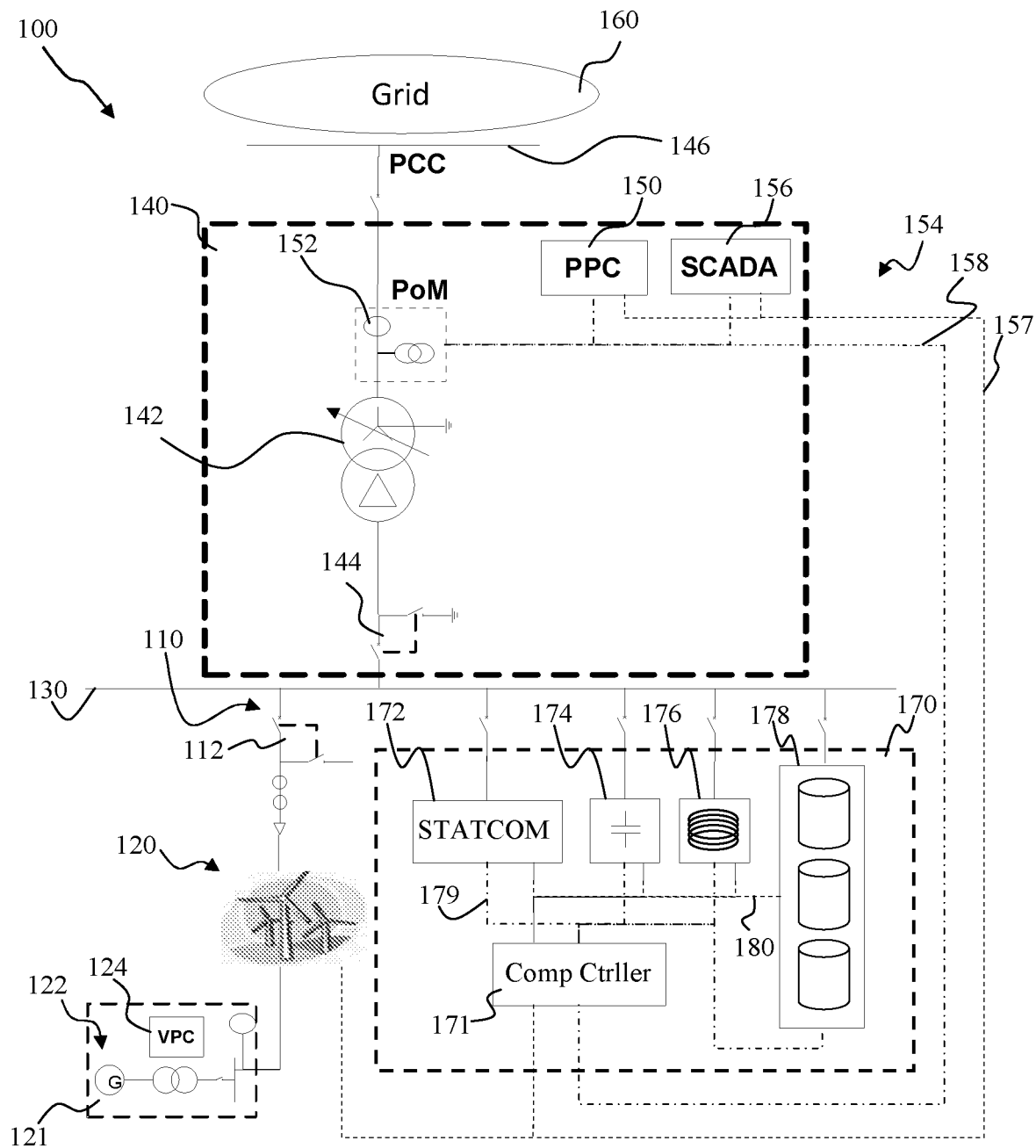
FIG. 1 illustrates a wind power plant according to an embodiment.

Embodiments of a method of operating a wind power plant and a wind power plant are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a system and/or an apparatus which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the system or apparatus.

A computing system or a controller or a microcontroller or any other system providing a processing capability can be presented according to various embodiments in the present disclosure. Such a system can be taken to include a processor. A system or apparatus according to various embodiments can include a controller which may include a memory which is for example used in the processing carried out by the controller. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to various embodiments in the present disclosure and may encompass a "circuit" as above, or may be understood to be any kind of a logic-implementing entity therefrom.

FIG. 1 illustrates a wind power plant according to an embodiment. In an embodiment, wind turbine plant or a wind power plant 100, is provided. A wind power plant is typically formed as a collection of wind generation units, or wind turbine generators, such that control is centralized and a single coupling is made to an electrical grid, or an electrical transmission grid, or an electrical distribution grid, or a power grid 160. In various embodiments, the wind power plant 100 can be connectable to an electrical grid 160.

In an embodiment, wind power plant 100 can include a plurality of wind turbine generators, or wind turbines, 120, electrically coupled to the wind power plant 100. In an embodiment, the wind power plant 100 includes a fleet of similar wind turbine generators 120. In other embodiments, it is possible to have a variety of wind turbine generators connected to the transmission branches in the wind power plant. This is as wind turbine generators are typically geographically distributed at various locations where prevailing winds would be better utilized by different types of wind turbine generators.

The wind turbine generators 120 are coupled to a plant distribution bus bar 130, which can be known as a main bus bar or a medium voltage (MV) bus, through a transmission branch 110. The wind power plant 100 can include a plurality of transmission branches 110, each including a plurality of wind turbine generators 120 electrically connected to a corresponding transmission branch. In an embodiment, there are two wind turbines connected to a transmission branch. However, there are typically no guidelines as to the number of wind turbines per transmission branch, simply by preference of physical location.

In embodiments, a transmission branch 110 can include a circuit breaker 112, which can be configured to protect both the wind turbines generators 120 connected to the transmission branch 110 and other portions of the wind power plant 100 from power surges or spikes might take place when there is a fault in the electrical grid 160 or in the plant 100. In such an instance, the circuit breaker 112 trips into an open circuit condition, and isolates the transmission branch 110 from the wind power plant 100, until the fault is identified and addressed, and plant electrical systems are back in order for the reconnection of the transmission branch 110.

The wind power plant 100 can include a plant substation 140 which can be coupled to the plant distribution busbar 130. Plant substations can either be a physical area of the wind power plant or an aggregated number of features spread over the plant. In an embodiment, the substation 140 is presented as being located in one physical area. According to the embodiment, the main components of the substation 140 are the main transformer 142, which steps up generated power in the plant to an appropriate voltage to be provided to an electrical grid 160, and the main switchgear 144, which defines an active switch for the wind power plant. The plant substation 140 sits in between the wind turbines 120 of the wind power plant 100 and the point of common coupling 146 to the electrical grid 160.

Operation of the wind power plant 100 is controlled by a power plant controller ("PPC") 150 that dispatches various reference set points to individual wind turbine generators 120 in the wind power plant 100. The power plant controller 150 also receives multiple sources of measurements or output readings from the wind turbine generators 120, as well as from various locations on transmission branch 110, the distribution busbar 130, the plant substation 140, and the electrical grid 160, and uses the information received to optimize the wind power plant contribution to the electrical grid. The power plant controller 150 can also receive set points for operation from the grid operator of the electrical grid 160 the wind power plant 100 is coupled to.

According to an embodiment, the PPC 150 of the wind power plant 100 is part of a supervisory control and data acquisition (SCADA) network 154 coupling the plant 100 and the plurality of wind turbine generators 120 in the plant 100 to a remote data and control center. The plant SCADA network 154 can include data transmission coupling between plant and turbine controllers provided by a laid fiber optic transmission. Further, the SCADA network 154 can include connectivity between the plant controller 150 and various auxiliary equipment in the wind power plant 100, for example, power compensation equipment, energy storage systems, advanced control systems, weather detection systems, etc. The SCADA network 154 can also facilitate the communication of data information and measurement information. In embodiments, separate communication lines can be provided for the communication of data information and measurement information. In various embodiments, a data communication line 157 is provided in the wind power plant 100. A measurement communication line 158 can also be provided in the wind power plant 100.

In various embodiments, the wind power plant 100 includes a SCADA control module 156, configured to provide control and oversight of the SCADA network 154. The SCADA control module 156 can include sub-systems to consolidate measurement data received from the components of the plant, to communicate messages, and various other operational functions. In embodiments, the SCADA control module 156 and the PPC 150 can be physically located in the plant substation. In embodiments, the SCADA control module 156 and the PPC 150 can be located in an annexure of the wind power plant 100. It is understood that physical location poses no limitation to the operation of the wind power plant 100.

In an embodiment, a sensor 152 is provided at the point of common coupling 146, and the resultant output is provided to the PPC 150 for monitoring of electrical characteristics of the electrical grid 160. A voltage, current and power characteristic can be monitored, and post-processed to various useful characteristic formats by the PPC 150. The point of measurement (PoM) for the wind power plant 100 can be on the high voltage side of the main transformer 142, or at the point of common coupling 146. Additional equipment can be provided at the PoM, for example, but not limited to, an energy meter, along with a current transformer, or a potential transformer.

According to various embodiments, the plurality of wind turbine generators can include one or more types or versions of wind turbine generators. A wind turbine generator 121 is schematically represented and can representatively exemplify a wind turbine generator of the plurality of wind turbine generators. The wind turbine generator 121 can include a plurality of rotor blades driving a rotating main shaft which is mechanically coupled to a gearbox which steps up the rotation for a high-speed generator shaft of a power production system 122. In an embodiment, the power production system 122 includes a doubly fed induction generator (DFIG in which the generator shaft is coupled to the generator rotor or Type3). In an embodiment, the generator is a Full Converter Generator (Type4) generator. The Type4 generator is coupled to a full scale power converter. The method as described in embodiments of the present disclosure is applicable to both Type3 and Type4 machine. In the doubly fed induction generator, mechanical torque is converted into electrical power, which is thereafter provided to a frequency converter for power conditioning. The output of the frequency converter is stepped up with a transformer provided in the turbine, which subsequently produces electrical power rated at 30 kV (it can be any voltage rating from 10 kV to 35 kV) to the transmission branch 110. In various embodiments, the transformer can step the electrical power up to a voltage rating of from 10 kV to 35 kV.

In other embodiments, the turbines in the plant can include a power production system including a generator which can be a singly-fed synchronous generator, an induction generator, a permanent magnet generator or any other type of generator including a stator winding. Further, turbines in other embodiments can include a power production system including direct drive or other alternative drive systems, which shift away from the use of a traditional gearbox. Any wind turbine power production system electrical configuration can be possible in satisfying the purpose of electrical power generation from kinetic wind capture.

According to an embodiment, in normal operation, wind turbine generator 121 receives a power reference from the PPC 150 such that a controlled output of electrical power is generated. The power references generated by the PPC 150 depends on the grid operating condition as experienced by the grid 160 operator, as well as the presently experienced wind for energy conversion. In an embodiment, the power reference from the PPC 150 can be provided as an active power reference P* and a reactive power reference Q*, indicating to the wind turbine generator 121 as the required amount of power to be generated and supplied by the wind turbine generator 121 as part of the wind power plant's contribution to the electrical grid 160. In an embodiment, the power reference from the PPC 150 can also be a power factor reference, which can be defined as the ratio of the real power to the apparent power in the circuit In an embodiment, wind turbine generator 121 includes a wind turbine controller (not shown). The wind turbine controller includes control capabilities for controlling various aspects of wind turbine functionality, for example, wind capture optimization in nacelle yaw and blade pitch capabilities, emergency procedures such as emergency brake or turbine shutdown, or electrical production control. In various embodiments, the wind turbine controller is configured to maximize power production, whilst preventing damage to the wind turbine or to the load.

In an embodiment, the wind turbine controller can include a wind turbine power controller 124. The wind turbine power controller 124 can be provided with processing power, such as with computers, microprocessors, microcontrollers, digital signal processing (DSP) boards, Application Specific Integrated Circuits (ASICs) or any others, and with accompanying appropriate memory modules or any non-transitory computer-readable storage medium.

The wind turbine power controller 124 is provided for the supervision of the power production capability of the wind turbine generator 121. In various embodiments, the wind turbine power controller 124 is coupled to the PPC 150 and receives from the PPC 150 an active power reference P* and a reactive power reference Q* for a provision requirement of the wind turbine generator 121 to the plant 100. Further, the wind turbine power controller 124 is coupled to and is constant communication with the wind turbine controller. In various embodiments, information regarding the control of the wind turbine generator 121 is provided to the wind turbine controller for executing, and sensor information is provided to the wind turbine power controller 124 for use in optimizing power generation by the wind turbine generator 120. Under normal operating conditions the turbine will follow the P* and Q* reference from the PPC.

According to an embodiment, the wind power plant 100 can include power compensation equipment or plant compensation equipment 170. The power compensation equipment can be coupled onto the plant distribution busbar 130.

The power compensation equipment can include dynamic reactive power support equipment, for example, SVCs or a static synchronous compensator (STATCOM) 172, where the STATCOM can include a combination of smaller power delivery units. The power compensation equipment can also include static reactive power support equipment, for example, switched capacitor banks 174 and switched inductor banks 176. Further, other kinds of power compensation equipment could also be possible, such as for example, static condensers and synchronous condensers. According to various embodiments, the power compensation equipment can include a set of compensator modules 178. Such compensation modules 178 can include capacitor banks, STATCOM modules, SVC banks, or any other compensation equipment which can provide reactive power for regulation. In embodiments, the compensation modules 178 can include 3 sets of capacitor banks.

The power compensation equipment can be used to control the power factor, the level of reactive power contributed, or the voltage level of the point of common coupling 146. In embodiments, the power compensation equipment can also be located together with the plant substation 140. In other embodiments, the power compensation equipment could be distributed to and located at each wind turbine generator 121.

Power compensation equipment can be configured to support the wind power plant 100 through various disturbances in the grid 160. For example, the power compensation equipment can be configured to support the grid 160 during, for example, voltage dips and sags, voltage swells, voltage fluctuations, short duration interruptions, unbalances, or other forms of disturbances.

According to embodiments, various components in the power compensation equipment can be coupled together for communication purposes. In an embodiment, the STATCOM 172, the capacitor banks 174 and the inductor banks 176 can be coupled together for communication purposes in an internal communication network 180. A central compensation controller 171 can provide supervision for operational functionality of the power compensation equipment. Further, output information of various components in the compensation equipment can be obtained and provided to the compensation controller 171 for measurement purposes, in an internal measurement network 179. In embodiments, the PPC 150 can be coupled to the compensation controller 171 through the data communication line 157 and the measurement communication line 158, and through the compensation controller 171, achieve operational control and monitoring over various components of the power compensation equipment. In embodiments, the PPC can communicate directly with the various components of the plant compensation equipment. For example, the SCADA network 154 can include a direct connection with the STATCOM 172. In embodiments, the STATCOM 172 can be coupled to a data communication line 157 and measurement communication line 158. In such a way, the STATCOM 172 can be controlled directly and effectively from the PPC 150. In embodiments, each of the compensator modules 178 is coupled directly to the PPC 150 and can be controlled directly and effectively from the PPC 150.

In operation, the plant compensation equipment 170 is switched on to support the wind power plant 100 through various disturbances in the electrical grid 160. The PPC 150 can monitor the electrical grid 160 through sensor 152 and determine a requirement for additional power. In the situation of, for example, a grid voltage dip, additional reactive power is required from the wind power plant 100 in support of electrical grid recovery. As indicated, a reactive power reference Q* is determined by the PPC 150. The PPC 150 further switches the equipment 170 on to provide additional reactive power, if the reactive power injection cannot be fully supported by the wind turbine generators 120.

According to embodiments, the plant compensation equipment can include several compensator modules 178 coupled together in performing a compensation function for the wind power plant 100. According to embodiments, the compensator modules 178 can be capacitor banks. In a representative embodiment, a wind power plant 100, made up of a plurality of wind turbine generators 120, can be rated at 83 MW at full capacity. In supporting such a rated wind power plant 100, the compensator modules 178 can include a rating of 18.5 MVAR to support the wind power plant 100 in complying with electrical grid requirements or grid reactive power requirements. In embodiments, the compensator modules 178 can include three capacitor banks 178, 179, 180, of 6, 6 and 6.5 MVAR respectively.

Figure 2:
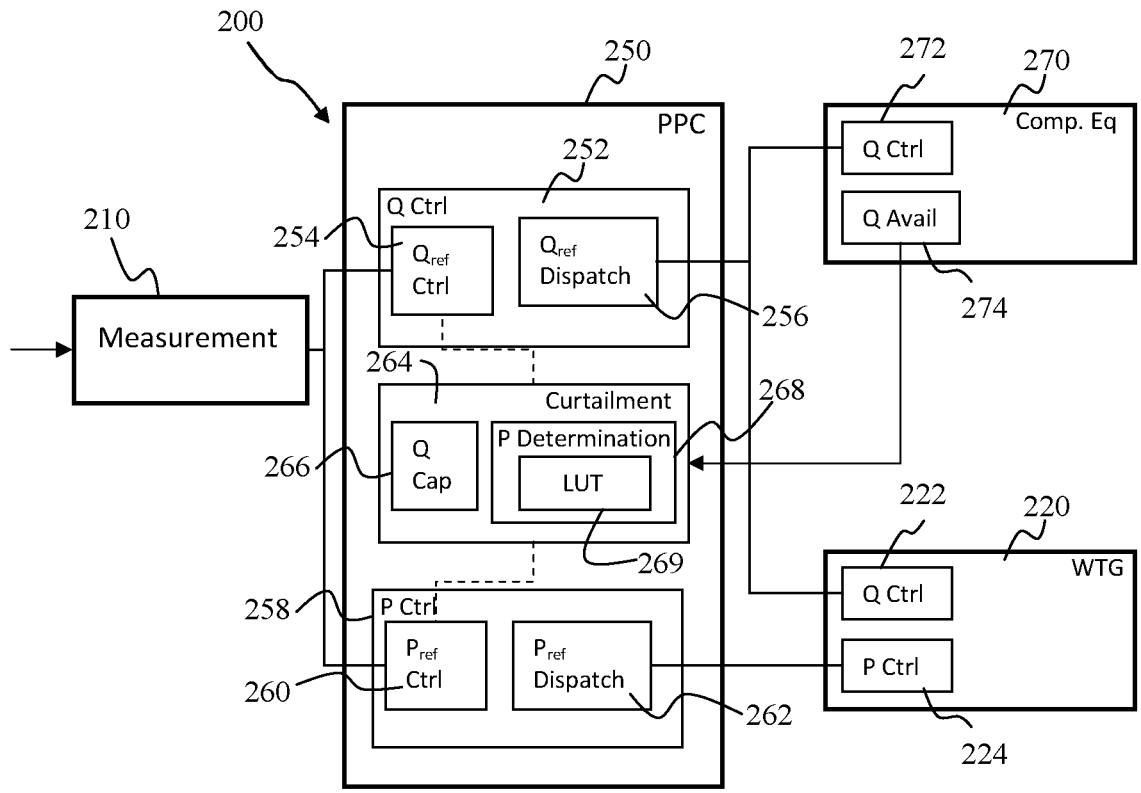
FIG. 2 illustrates a control schematic in the operation of a wind power plant according to an embodiment.

FIG. 2 illustrates a control schematic in the operation of a wind power plant according to an embodiment. In various embodiments, the wind power plant 100 can include relevant control mechanisms such as microcontrollers or microprocessors which are configured to carry out a control scheme 200 in the operation of the wind power plant 100. According to embodiments, a measurement module 210 is configured to receive information regarding the electrical grid 160. The measurement module 210 can include sensors arranged to measure electrical characteristics of the electrical grid 160. The measurement module 210 can measure—electrical parameters such as voltage, current, active power, reactive power etc at the point of common coupling (PCC). Further, the measurement module 210 can also include sensors arranged to measure electrical characteristics of electrical energy generated by the wind power plant 100 and arranged for delivery to the electrical grid 160.

The measurement module 210 thereafter provides measured electrical readings of the electrical grid and the wind power plant generated power and communicates the measurements to the PPC 250. The PPC 250 can include a Q control module 252, the Q control module 252 configured to receive measurement readings of the electrical grid 160 from the measurement module 210 and arranged to generate and issue a reactive power reference $Q_{ref}$. Q control module 252 can include a $Q_{ref}$ controller 254, configured to received measured electrical characteristics of the electrical grid and plant and generate a $Q_{rd}$ output therefrom. The $Q_{ref}$ value is thereafter provided to a $Q_{ref}$ dispatch module 256, which communicates the $Q_{rd}$ value to various components in the wind power plant 100. In embodiments, the $Q_{ref}$ dispatch module 256 can break down the reactive power reference to sub-system level, and provide a Q set point to the various components.

The PPC 250 can also include a P control module 258, the P control module 258 configured to receive measurement readings of the electrical grid 160 from the measurement module 210 and arranged to generate and issue an active power reference $P_{ref}$. P control module 258 can include a $P_{ref}$ controller 260, configured to received measured electrical characteristics of the electrical grid and plant and generate a $P_{ref}$ output therefrom. The $P_{ref}$ value is thereafter provided to a $P_{ref}$ dispatch module 262, which communicates the $P_{ref}$ value to various components in the wind power plant 100.

The PPC 250 is communicatively coupled to a plurality of wind turbines in the wind power plant 100. Block 220 representatively illustrates the control scheme 200 as pertaining to an individual wind turbine. Block 220 can be representative of a wind turbine power controller. In embodiments, the wind turbines of the wind power plant are similarly controlled with respect to control scheme. Of course, various parameters and set points may differ with respect to individual wind turbine generators, according to turbine rating and condition. Generally, each wind turbine 220 includes a Q controller 222 and a P controller 224, arranged to receive a $Q_{ref}$ and a $P_{ref}$ respectively from the Q control module 252 and P control module 258 in the PPC 250. On receiving the reactive power reference $Q_{ref}$ and the active power reference $P_{ref}$, the wind turbine power controller 220 configures the power production system to generate and output the required type and amount of power.

In embodiments, the PPC 250 is communicatively coupled to a compensation controller 270. The compensation controller 270 can supervise the operation of the compensation equipment, which can include a plurality of compensator modules, for example, capacitor banks, which are arranged to provide an amount of reactive power upon requirement. It is noted that the compensation controller further includes supervision and operation of not only the compensator modules, but various other components of the plant compensation equipment, such as STATCOM 172, capacitors 174 and inductors 176. However the present description is directed specifically to the operation and function only of the compensator modules 178, but can be easily extended to various other components. For example, STATCOM 172 can include a plurality of small units of generation. For example a STATCOM rated at 20 MVAR can include 10 units of 2 MVAR rated modules. Such modules can be supervised by the compensation controller 270 or the PPC 250.

The amount of reactive power to be provided by the compensator modules can be derived from the $Q_{ref}$ value received from the $Q_{ref}$ dispatch module 256 in the PPC 250. The $Q_{ref}$ value is received by a Q controller 272 in the compensation controller 270, which thereafter controls the compensator modules to provide the requested reactive power.

It is noted that the compensation controller 270 oversees the operational capability of the compensator modules. In an embodiment, the compensation controller 270 can be communicatively coupled with each of the compensator modules 178. Accordingly, in various embodiments, the PPC 250 is communicatively coupled to each of the compensator modules 178. The compensator modules can be monitored for operational status and for output functionality and efficiency, amongst other parameters. Such monitoring information can be provided back to the PPC 250 through the compensation controller 270 for further action.

According to embodiments, the compensation controller 270 can include a Q Availability module 274, which can include processing of operational status monitoring data and provide a feedback to the PPC 250 indicating the amount of reactive power capability the compensator modules 178 are able to support.

The monitoring information can include where a fault is indicated in the operation of the plant compensation equipment. In embodiments, the monitoring information can include where a fault is indicated in the operation of the compensator modules. As mentioned, there are situations in which the installed compensator modules may not be operating at full capacity. For example, one or more of individual compensator modules can be operating at sub-optimal efficiency, or can have a status of partial or complete failure due to physical component breakdown. In addition, the fault can include a communication failure between any one of the compensator modules and the compensation controller, or in the SCADA network linking the PPC to the compensation controller and compensator modules. Further, the fault can include, for example, an electrical switch or component failure, which can prevent the installed compensator modules from being switched in or out by the PPC.

In the event that a fault is indicated in the installed compensator modules, and the compensator modules are operating at sub-optimal capacity, or not operating at all, or that some or all of the compensation modules are not able to be operated by the PPC, the reactive power contribution of the wind power plant is affected. In current methodologies, upon the PPC identifying a fault in the plant compensation equipment, the PPC registers the lowered reactive power capability, for example, where one or more compensation modules are inoperable, and the Q control module of the PPC modifies and lowers the $Q_{ref}$ and dispatches therefrom. The drawback of such current methodologies can be that the grid codes may not be complied with, as the reactive power injection capability of the wind power plant is compromised with the fault in the plant compensation equipment. Such non-compliance can lead to severe penalties imposed by grid operators for violation of the grid codes.

Figure 3:
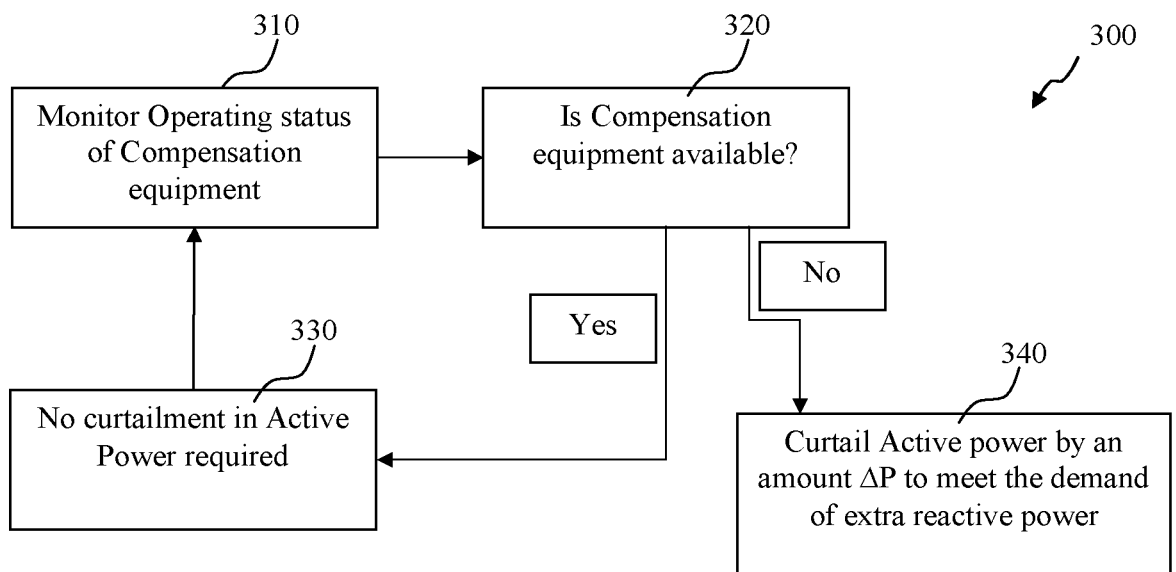
FIG. 3 illustrates a block schematic of a fall back method according to embodiments.

FIG. 3 illustrates a block schematic of a fall back method according to embodiments. A fall back strategy 300 is provided, according to various embodiments of the present disclosure. Such a fall back method provides a dynamic compliance of a wind power plant 100 to various electrical grid codes in view of a reactive power capability of the wind power plant 100. According to embodiments, in 310, the method can include monitoring an operating status of a plant compensation equipment. In 320, the method considers the availability of the compensation equipment. If the compensation equipment is available, no curtailment of active power is required, as under 330. The method thereafter cycles back to 310 for a continued monitoring of the operating status.

According to embodiments, if parts or all of the compensation equipment is not available, the method carries out block 340, in which active power is curtailed. In embodiments, in 340, the active power is curtailed by an amount AP to meet the demand of extra reactive power in MVAR from the wind turbine generators. According to embodiments, the method can further include identifying a deficiency in a reactive power capability of the wind power plant based on the unavailable compensation equipment.

The deficiency can be due to a fault in the compensation equipment, including a reduction in the operational status of the compensation equipment, leading to sub-optimal contribution. A fault can also include a full non-operation of the compensation equipment. Such a fault can also include a data communication breakdown with the compensation equipment, leading to an inability or a reduction in ability of operation of the compensation equipment.

In curtailing active power, the method can include curtailing active power generation of the wind power plant to comply with the operation of the wind power plant under the grid connection code of the coupled electrical grid. According to embodiments, the active power of the wind power plant is curtailed to comply with a grid code requirement of requiring a fixed amount of reactive power export based on the nominal rating of the wind power plant. In embodiments, the active power of the wind power plant is curtailed to overcome a deficiency in reactive power capability of the wind power plant, with respect to the nominal rating of the wind power plant. In embodiments, the wind power plant adjusts the nominal rating of the wind power plant, in accordance to a reduced reactive power capability. In embodiments, the active power capability of the wind power plant is optimized based on the reduced reactive power capability. In embodiments, the active power generation of the wind power plant is curtailed based on the reduced reactive power capability in optimizing active power generation.

According to various embodiments, a fall back strategy is introduced and incorporated into the wind power plant operation scheme. Such a fall back strategy is initiated and is carried out in response to identifying a fault in the plant compensation equipment 170 of the wind power plant 100. Referring back to FIG. 2, compensation controller 270 carries out a monitoring of an operational status of the plant compensation equipment 170. In embodiments, compensation controller 270 carries out monitoring of an operational status of compensator modules 178. Further, compensation controller 270 monitors data communication with compensator modules 178, as part of operational status monitoring.

In the event of a fault detection, the operational status of the compensator modules can be compromised, and the plant compensation equipment 170 is no longer able to provide the rated amount of reactive power, leading to a downward adjustment in the reactive power capability of the plant compensation equipment 170. STATCOM controller 270 can carry out such an adjustment of the plant compensation equipment reactive power capability, with Q availability module 274, and provide such feedback to PPC 250. PPC 250 receives such feedback information and adjusts downwards the total plant reactive power capability of the wind power plant 100.

According to various embodiments, to comply with grid code requirements, the active power capability of the wind power plant 100 is downwardly adjusted. PPC 250 can include a curtailment module 264, which can be configured to curtail the amount of active power which can be provided by the wind power plant 100 to the electrical grid. As mentioned above, the active power capability, or the nominal rating, of the wind power plant 100 is curtailed or reduced, so as to allow the wind power plant 100 to functionally comply with grid requirements. In embodiments, the active power capability is curtailed to comply with grid requirements, but is optimized to provide the maximum allowable active power based on the grid requirements and the reactive power capability.

Curtailment module 264 can include a Q capability module 266, which can be configured to compile the reactive power capability of the wind power plant. Such reactive power capability can take into account the reactive power generation capability of the wind turbine generators 120 as well as the reactive power capability of the plant compensation equipment 170. According to embodiments, when a fault is detected in the plant compensation equipment 170, Q availability module 274 reduces the plant compensation equipment reactive power capability, and provides such a reduced capability value on to curtailment module 264 and Q capability module 266 for further processing.

In compiling and adjusting downwards a reactive power capability of the wind power plant, the Q capability module 266 identifies the amount of reactive power the wind power plant can provide when required. The reactive power capability value is thereafter provided to a P determination module 268, which can be configured to derive an amount of active power to be curtailed. The P determination module 268 determines the amount of active power to be curtailed from the rated power of the wind power plant 100 and thus derives a reduced active power capability of the wind power plant 100.

In various embodiments, a reference comparison is carried out in determining an optimized amount of active power to be generated by the wind power plant, with respect to the required reactive power capability. According to various embodiments, the curtailment module 264 can include a look-up table (LUT) module 269, the LUT module 269 capable of being operated as part of P determination module 268. In embodiments, the LUT module 269 can provide the reduced active power capability of the wind power plant optimized within the grid code requirement with respect to the reactive power capability. It is noted that with the fall back strategy method according to present embodiments, the wind power plant is capable of continuous operation within grid code requirements, without any costly hardware upgrade.

It is noted that the values for comparison within the LUT module 269 are comprehensively calculated and extracted based on thorough and complete engineering power system studies which can be carried out prior to the installation or commissioning of the wind power plant. Such engineering studies are generated based off a plurality of wind power plant parameters, with respect to the associated grid code requirements, and require considerable processing power and computational time to compile. It can be noted that such studies to determine LUT values which bring about compliance with grid code requirements are at the same time optimized for production under the same requirements. Pre-determining LUT values relieves the PPC from having to carry out a contemporaneous calculation of the reduced active power capability based on the reactive power capability, which could require powerful processing capability, as well as take a relatively long time for completion of such complex calculations as such calculations take into account site conditions and installation parameters. In such case, utilization of a look up table provides a quick and sufficiently accurate return reduced active power capability, as compared with calculation of the reduced active power capability. Nevertheless, in various embodiments, the P determination module can include a calculation module to provide a reduced active power capability based on the reactive power capability.

According to various embodiments, the LUT module 269 can include a table for comparison between a reactive power capability and optimized active power capability. In embodiments, the table can provide a comparison between the number of available compensator modules and the maximum active power under grid code compliance. In an exemplified embodiment, the wind power plant can be rated at 83 MW at full capacity, and include power compensation equipment in the form of three capacitor banks of 6, 6 and 6.5 MVAR respectively. Such a wind power plant is tuned for optimized operation under full capacity within grid code requirements. In an embodiment, the following Table 1 can be provided in the LUT module 269 for active power determination.

TABLE 1

| Cap. Banks available (MVAR) | Optimized Active Power under compliance (MW) |
|---|---|
| 6 + 6 + 6.5 | 83 |
| 6 + 6 | 80 |
| 6 + 6.5 | 80.5 |

TABLE 1-continued

| Cap. Banks available (MVAR) | Optimized Active Power under compliance (MW) |
|---|---|
| 6.5 | 76.5 |
| No cap banks | 73.5 |

From the table, it can be noted that each time a compensator module or a capacitor bank fails and is removed from operation, the amount of active power the wind turbine can provide to the grid is correspondingly reduced. The table is provided for various combinations of compensator capacitor banks availability. It can be noted that the above table is representative of parameters involved in such a fall back strategy, and other parameters indicating reactive power capability and active power capability can be utilized instead. According to various embodiments, control algorithms based on previously determined engineering design simulations can be used instead of a LUT, in the determination of an optimized amount of active power to be generated by the wind power plant.

Once determined, the reactive power capability value and the optimized active power capability value is provided to the $Q_{ref}$ control module 254 and the $P_{ref}$ control module 260 for further processing and relaying of power control set points to the wind turbine generators 120 and the power compensation equipment accordingly. According to various embodiments, the $P_{ref}$ controller 260 can include a power limiting module, configured to limit the power produced by the wind power plant, according to the optimized active power value received from curtailment module 264.

In various embodiments, the PPC 250 is capable of optimizing the amount of active power the wind power plant should produce, based on the LUT module 269, in order to meet the grid code all times in the event of a plant compensation equipment fault. Active power capability can be revised with a 1 second sample time with monitoring of the communication signal. Further, if there is a communication signal failure with the compensator module, the compensator module is identified, and the active power capability can be revised with P determination module 268.

In embodiments, the PPC 150 can also measure the total reactive power injection at the plant distribution bus bar 130 or at the LV terminal of the main transformer 142 to find out whether the capacitor bank with which there is no communication is switched ON or OFF. The PPC 150 can trigger an alarm or revise the $Q_{ref}$ if the Cap bank is ON and if that is not the intended status & vice versa.

Figure 4A:
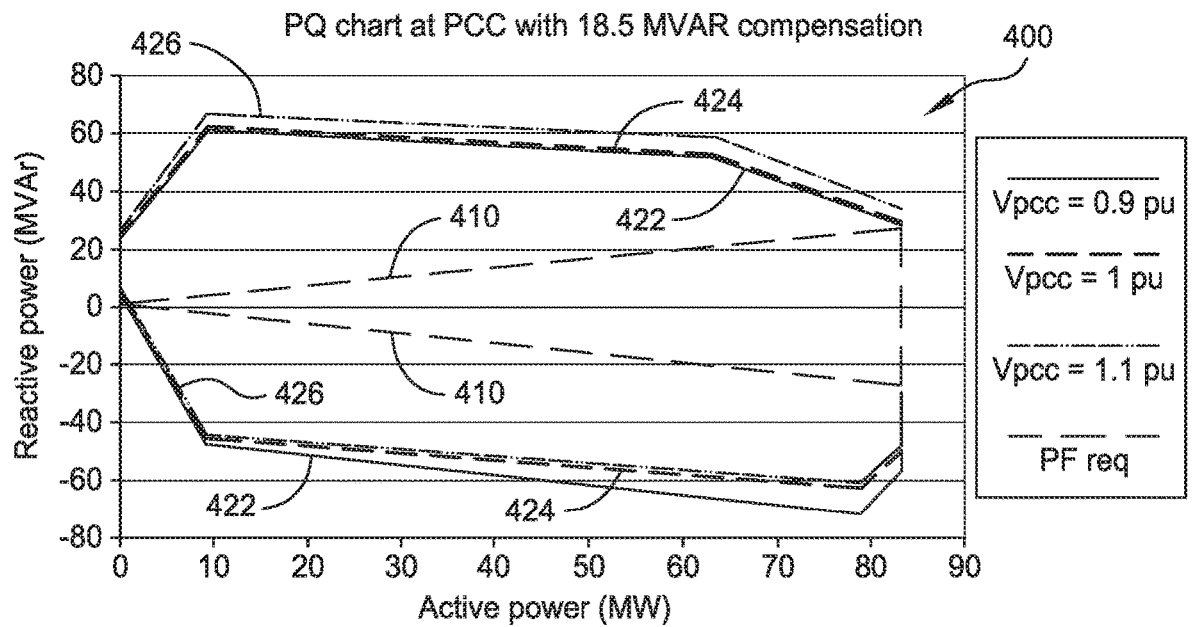
FIG. 4A illustrates a PQ chart of a wind power plant with fully operational installed reactive power capability.

FIG. 4A illustrates a PQ chart of a wind power plant with fully operational installed reactive power capability. According to a representative example, a wind power plant is provided with a nominal rated power of 83 MW. Chart 400 includes an indication of a grid PQ requirement or power factor requirement 410, in which can be observed, requires the wind power plant to provide a reactive power generation capability of about 27 MVAR when the wind power plant is generating at the nominal active power output of 83 MW. The reactive power generation capability can be provided by the wind turbine generators in the plant, supplemented by power compensation equipment. In embodiments, capacitor banks can provide up to 18.5 MVAR compensation when required.

Curve 422, 424, 426 relate to the reactive power capability of the wind power plant according to the representative example, corresponding to a grid voltage of 0.9, 1.0 and 1.1 p.u. respectively. It can be observed that the reactive power capability of the wind power plant complies with grid requirement 410 at every point of active power generation. The provision of the power compensation equipment provides a positive offset and supplement to the actual reactive power capability of the wind power plant.

Figure 4B:
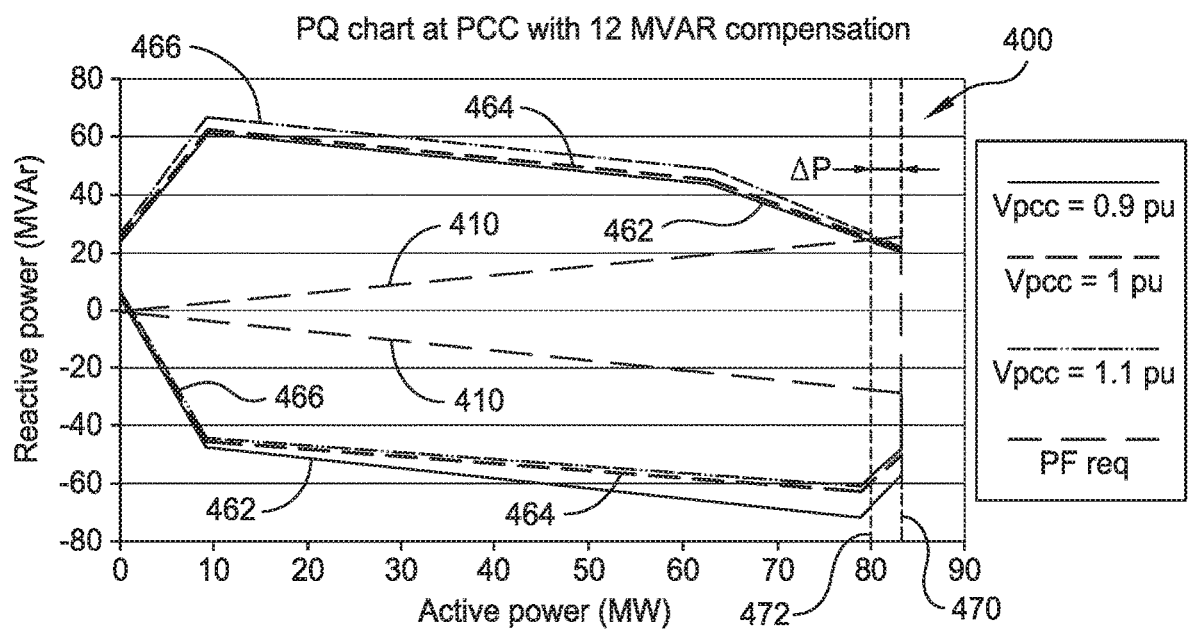
FIG. 4B illustrates a PQ chart of the wind power plant of FIG. 4A with reduced reactive power capability.

FIG. 4B illustrates a PQ chart of the wind power plant of FIG. 4A with reduced reactive power capability. In chart 450, grid PQ requirement 410 is similarly provided, for the wind power plant rated at 83 MW. In such a representative example, one of the compensator modules, a capacitor bank rated at 6.5 MVAR is considered to be faulty and thus non-operational. The reactive power capability of the power compensation equipment is thus at 12 MVAR. Curves 462, 464, 466 show the reactive power capability of the wind power plant according to the representative example, corresponding to a grid voltage of 0.9, 1.0 and 1.1 p.u. respectively. It can be observed from reference line 470 that when the wind power plant operates at nominal capacity, i.e. 83 MW, the grid code power factor requirement cannot be met.

Reference line 472 indicates an intersection of curve 462, which sets out the reactive power capability of the plant at a grid voltage of 0.9 p.u., and grid requirement 410. It can be observed that the reference line indicates the maximum or optimized amount of active power the plant can generate and provide to the electrical grid, while performing under compliance of the grid requirements. The curtailment amount, ΔP, can be observed to be the difference between the active power values of reference lines 470 and 472. This is the amount of active power to be reduced by the wind power plant in response to the loss of power compensation equipment. Further, such a curtailment amount can be considered to be optimal curtailment amount. Such a curtailment amount can be based on the additional reactive power required due to non-availability of reactive compensation equipment.

According to various embodiments, when carrying out such a fall back strategy method according to the present disclosure, the wind power plant 100 can support grid frequency regulation activities. At present, electrical grid operators sometimes include spinning reserves to support frequency fluctuations and to restore operating frequency. Generally, active power is increased and provided into the electrical grid to support the frequency restoration. In carrying out such a fall back strategy as described, a wind power plant can as such hold a form of spinning reserve, for which the plant operator can make available to the electrical grid.

The wind power plant can consider the curtailed amount of active power, due to grid code compliance in reduced reactive power capability, as a form of reserve for provision to the electrical grid. In a frequency fluctuation situation, full active power is required from power generating sets coupled to the electrical grid. As such, the grid code power factor requirement is made temporarily negligible. After the grid frequency is restored, the wind power plant can settle back into operating at the reduced nominal power generation level.

Figure 5:
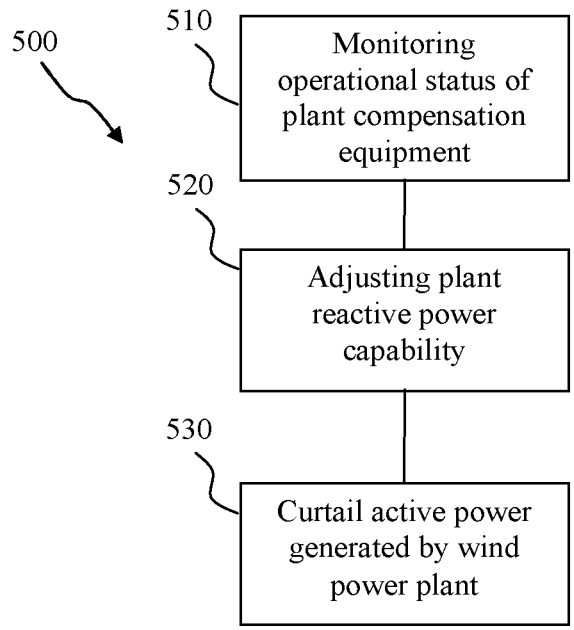
FIG. 5 illustrates a method for operating a wind power plant according to an embodiment.

FIG. 5 illustrates a method 500 for operating a wind power plant according to an embodiment. In an embodiment, the method is a method for controlling power generation of a wind power plant. The wind power plant can include a power plant controller for controlling a plurality of wind turbine generators in the wind power plant. In 510, the method includes monitoring an operational status of a plant compensation equipment. In 520, the method includes adjusting a plant reactive power capability when the operational status of the plant compensation equipment indicates a fault in the plant compensation equipment. In 530, the method includes controlling the wind power plant to curtail the active power generated by the wind power plant by a curtailment amount determined based on the adjusted plant reactive power capability.

By providing such a method for controlling a wind power plant active power capability, a wind power plant is provided with a capability of adhering to grid code power factor requirements. Such a method for controlling the active power generation of a wind power plant allows the wind power plant to meet reactive power or power factor requirements laid out by the applicable grid code in case the reactive compensation module such as capacitor banks or STATCOMs are temporarily out of service due to malfunctioning or servicing, etc. Such a capability is achieved even in the event of fault in one or more components of power compensation equipment. With such a dynamic adjustment in the control of active power capability, the wind power plant need not disconnect from the electrical grid until faulty equipment can be repaired or replaced, nor be subject to penalties for not complying with grid code requirements.

With this method, re-rating of the plant can also be dynamically adjusted based on the reactive power capability of the wind power plant. Advantageously, complying with grid code requirements can be carried out by software or firmware improvements, and not actual costly equipment or hardware changes.

In an embodiment, the method further includes optimizing the active power generated by the wind power plant based on a grid code requirement. In an embodiment, the method further includes optimizing the active power generated by the wind power plant based on additional reactive power required due to non-availability of plant compensation equipment.

In an embodiment, the method further includes comparing the plant reactive power capability with the grid code requirement to optimize the active power generated by the wind power plant. The optimization of active power can include the optimization of the curtailment of active power generated.

In an embodiment, the method further includes obtaining the curtailment amount from a look-up table comparison.

In an embodiment, the values of the curtailment amount in the look-up table are predetermined by a power system study.

In an embodiment, monitoring an operational status of the plant compensation equipment includes any one of monitoring operational capability of the plant compensation equipment and monitoring communication between plant compensation equipment and the power plant controller.

In an embodiment, the method further includes a sampling rate of about 1 second in monitoring the operational status of the plant compensation equipment.

In an embodiment, the method further includes monitoring the grid frequency for a drop in grid frequency;

In an embodiment, the method further includes controlling the wind power plant to maximize active power output, including use of the curtailment amount, to support the grid frequency recovery.

In an embodiment, the method further includes allocating the curtailment amount to a grid operator of the power grid as spinning reserve for supporting a grid frequency drop.

Figure 6:
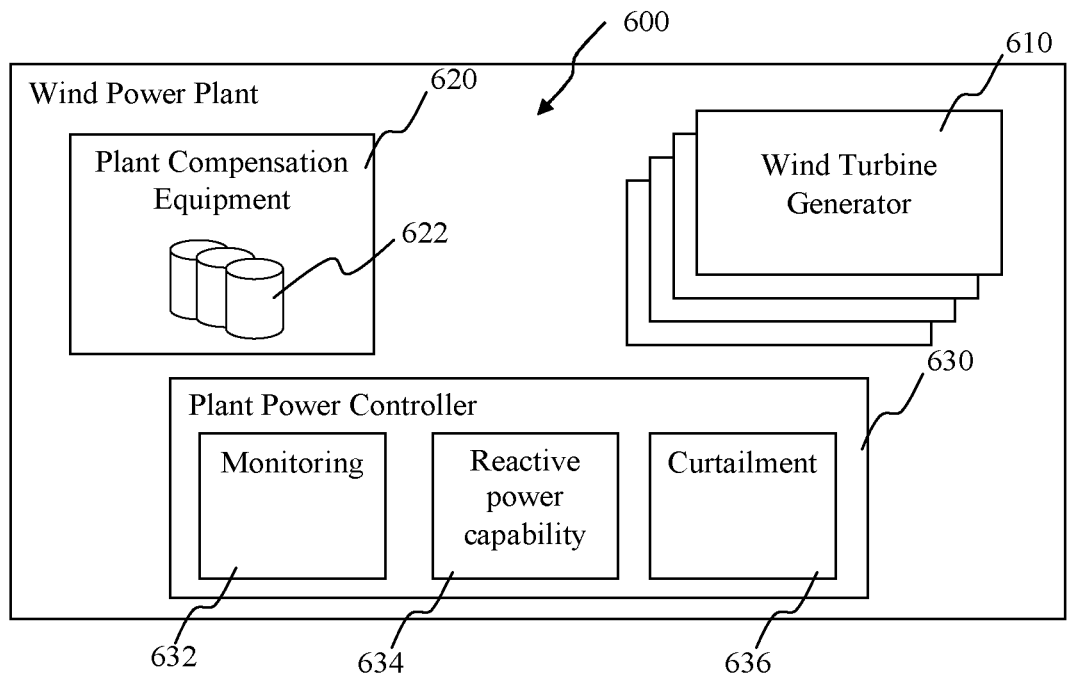
FIG. 6 illustrates a wind power plant according to an embodiment.

FIG. 6 illustrates a wind power plant according to an embodiment. A wind power plant 600 is provided. In an embodiment, the wind power plant 600 is configured to carry out the above-described method for controlling a wind power plant. In an embodiment, the wind power plant is configured to carry out a method for controlling active power generation of a wind power plant. The wind power plant 600 includes a plurality of wind turbine generators 610. The wind power plant 600 also includes plant compensation equipment 620, which can include a plurality of compensation modules 622. The wind power plant also includes a power plant controller 630. According to an embodiment, the power plant controller 630 is configured to control the plurality of wind turbine generators 610. Further, the power plant controller 630 can include a monitoring module 632 configured to monitor an operational status of the plant compensation equipment. The power plant controller 630 can include a reactive power capability module 634 configured to adjust a plant reactive power capability when the operational status of the plant compensation equipment indicates a fault in the plant compensation equipment. In addition, the power plant controller 630 can include a curtailment module 636 configured to control the wind power plant to curtail the active power generated by the wind power plant by a curtailment amount determined based on the adjusted plant reactive power capability.

In an embodiment, the power plant controller is configured to optimize the active power generated by the wind power plant based on a grid code requirement.

In an embodiment, the power plant controller is configured to compare the plant reactive power capability with the grid code requirement to optimize the active power generated by the wind power plant.

In an embodiment, the power plant controller is configured to obtain the curtailment amount from a look-up table comparison.

In an embodiment, the values of the curtailment amount in the look-up table are predetermined by a power system study.

In an embodiment, the power plant controller is configured to monitor operational capability of the plant compensation equipment and to monitor communication between plant compensation equipment and the power plant controller.

In an embodiment, the power plant controller including a sampling rate of about 1 second in monitoring the operational status of the plant compensation equipment.

In an embodiment, the power plant controller is configured to monitor the grid frequency for a drop in grid frequency.

In an embodiment, the power plant controller is configured to control the wind power plant to maximize active power output, including use of the curtailment amount, to support the grid frequency recovery.

In an embodiment, the power plant controller is configured to the active power generated by a wind turbine generator operating above allocating the curtailment amount to a grid operator of the power grid as spinning reserve for supporting a grid.

In an embodiment, the compensation modules can include any one of a capacitor module, a STATCOM module, a SVC module, or an inductor module.

In an embodiment, a data communication coupling between the power plant controller and the compensation modules.

In an embodiment, the data communication coupling is provided between the power plant controller and each of the compensation modules.

According to various embodiments, there is provided a computer program product directly loadable into the internal memory of at least one digital computer provided in a wind power plant, including software code portions for performing the steps of a method according to an embodiment of the present disclosure when the computer program product is run on the at least one digital computer.

In various embodiments, a controller for carrying out an operational function in the wind power plant, which includes for example, but not limited to, a plant controller, a power plant controller, a SCADA controller, a compensation controller, a wind turbine controller, a wind turbine power controller, or a reactive current controller, includes a digital computer configured to receive a computer program product. In embodiments, digital computers provided in the wind power plant are synchronized and operate cooperatively as part of an overall system.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method of controlling active power generation of a wind power plant coupled to a power grid, the wind power plant comprising a power plant controller for controlling a plurality of wind turbine generators, the method comprising:
    generating reactive power, using a reactive power source, to compensate for a disturbance in the power grid;
    monitoring, using the power plant controller, an operational status of the reactive power source;
    determining, using the power plant controller and based on the operational status, that there is at least a partial failure in the reactive power source resulting in a reduced reactive power generation capability, and in response adjusting a plant reactive power capability value to reflect the reduced reactive power generation capability;
    controlling, using the power plant controller and based on the plant reactive power capability value, the wind power plant to curtail the active power generated by the wind power plant by a curtailment amount corresponding to the reduced reactive power generation capability;
    monitoring a grid frequency for a drop in the grid frequency; and
    controlling the wind power plant to increase active power output, including use of the curtailment amount, to support grid frequency recovery.

2. The method according to claim 1, further comprising optimizing the active power generated by the wind power plant based on a grid code requirement.

3. The method according to claim 2, further comprising comparing the plant reactive power capability with the grid code requirement to optimize the active power generated by the wind power plant.

4. The method according to claim 1, further comprising obtaining the curtailment amount from a look-up table comparison.

5. The method according to claim 4, wherein the values of the curtailment amount in the look-up table are predetermined by a power system study.

6. The method according to claim 1, wherein monitoring an operational status of the reactive power source comprises any one of monitoring operational capability of the reactive power source and monitoring communication between the reactive power source and the power plant controller.

7. The method according to claim 1, further comprising a sampling rate of about 1 second in monitoring the operational status of the reactive power source.

8. The method according to claim 1, further comprising allocating the curtailment amount to a grid operator of the power grid as spinning reserve for supporting a grid frequency drop.

9. A wind power plant, comprising
    a plurality of wind turbine generators;
    a reactive power source configured to provide reactive power to compensate for a disturbance in a power grid and comprising a plurality of compensation modules; and
    a power plant controller, configured for controlling the plurality of wind turbine generators, comprising:
        a processor; and
        a memory storing a program, which, when executed on the processor, performs an operation, the operation comprising:
            monitoring an operational status of the reactive power source and determining based on the operational status that there is at least a partial failure in the reactive power source resulting in a reduced reactive power generation capability;
            adjusting a plant reactive power capability value to reflect the reduced reactive power generation capability, in response to the determination that there is at least the partial failure in the reactive power source;
            controlling, based on the plant reactive power capability value, the wind power plant to curtail an active power generated by the wind power plant by a curtailment amount corresponding to the reduced reactive power generation capability;
            monitoring a grid frequency for a drop in the grid frequency; and
            controlling the wind power plant to increase active power output, including use of the curtailment amount, to support grid frequency recovery.

10. The wind power plant of claim 9, wherein the compensation modules can comprise any one of a capacitor module, a STATCOM module, a SVC module, or an inductor module.

11. The wind power plant of claim 9, further comprising a data communication coupling between the power plant controller and the compensation modules.

12. The wind power plant of claim 11, wherein the data communication coupling is provided between the power plant controller and each of the compensation modules.

13. A computer program product loadable into an internal memory of at least one digital computer provided in a wind power plant coupled to a power grid and configured to control a plurality of wind turbine generators, the computer program product comprising software code portions for performing an operation for controlling active power generation of a wind power plant when the computer program product is run on the at least one digital computer, the operation comprising:

generating reactive power, using a reactive power source, to compensate for a disturbance in the power grid;

monitoring an operational status of the reactive power source;

determining, based on the operational status, that there is at least a partial failure in the reactive power source resulting in a reduced reactive power generation capability, and in response adjusting a plant reactive power capability value to reflect the reduced reactive power generation capability;

controlling, based on the plant reactive power capability value, the wind power plant to curtail the active power generated by the wind power plant by a curtailment amount corresponding to the reduced reactive power generation capability; and allocating the curtailment amount to a grid operator of the power grid as spinning reserve for supporting a grid frequency drop.

14. A method of controlling active power generation of a wind power plant coupled to a power grid, the wind power plant comprising a power plant controller for controlling a plurality of wind turbine generators, the method comprising:

generating reactive power, using a reactive power source, to compensate for a disturbance in the power grid;

monitoring, using the power plant controller, an operational status of the reactive power source using a sampling rate of about 1 second;

determining, using the power plant controller and based on the operational status, that there is at least a partial failure in the reactive power source resulting in a reduced reactive power generation capability, and in response adjusting a plant reactive power capability value to reflect the reduced reactive power generation capability; and controlling, using the power plant controller and based on the plant reactive power capability value, the wind power plant to curtail the active power generated by the wind power plant by a curtailment amount corresponding to the reduced reactive power generation capability.

* * * * *